United States Patent
Tsai

(10) Patent No.: US 8,328,209 B2
(45) Date of Patent: Dec. 11, 2012

(54) WIGGLING FREEWHEELED VEHICLE

(75) Inventor: Tong-Pei Tsai, Kaohsiung (TW)

(73) Assignee: Ching-Tsang Wu, Selangor Darul Ehsan (MY)

( * ) Notice: Subject to any disclaimer, the term of this patent is extended or adjusted under 35 U.S.C. 154(b) by 148 days.

(21) Appl. No.: 13/044,848

(22) Filed: Mar. 10, 2011

(65) Prior Publication Data

US 2012/0043733 A1  Feb. 23, 2012

(30) Foreign Application Priority Data

Aug. 19, 2010  (TW) ................................ 99215969 U

(51) Int. Cl.
*B62M 1/00* (2010.01)

(52) U.S. Cl. ............ 280/87.043; 280/87.042; 280/87.05

(58) Field of Classification Search .......... 280/87.041–87.043, 87.05, 651
See application file for complete search history.

(56) References Cited

U.S. PATENT DOCUMENTS

| 4,045,048 | A | * | 8/1977 | Irwin | 280/278 |
| 4,050,713 | A | * | 9/1977 | Williams | 280/278 |
| 4,065,146 | A | * | 12/1977 | Denzer | 280/278 |
| 4,076,270 | A | * | 2/1978 | Winchell | 280/220 |
| 4,087,104 | A | * | 5/1978 | Winchell et al. | 280/210 |
| 4,087,106 | A | * | 5/1978 | Winchell | 280/14.28 |
| 4,087,107 | A | * | 5/1978 | Winchell | 280/220 |
| 4,088,338 | A | * | 5/1978 | Winchell et al. | 280/220 |
| 4,123,079 | A | * | 10/1978 | Biskup | 280/87.042 |
| 4,133,551 | A | * | 1/1979 | Biskup | 280/221 |
| 4,165,093 | A | * | 8/1979 | Biskup | 280/220 |
| 6,220,612 | B1 | * | 4/2001 | Beleski, Jr. | 280/87.041 |
| 6,485,039 | B1 | * | 11/2002 | Ming-Fu | 280/87.041 |
| 6,499,751 | B1 | * | 12/2002 | Beleski, Jr. | 280/87.041 |
| 6,517,093 | B2 | * | 2/2003 | Feng | 280/87.042 |
| 6,554,302 | B1 | * | 4/2003 | Liu | 280/87.041 |
| 6,880,840 | B2 | * | 4/2005 | Chuang | 280/87.041 |
| 6,883,814 | B2 | * | 4/2005 | Chuang | 280/87.041 |
| 6,908,091 | B2 | * | 6/2005 | Chuang | 280/87.041 |
| 6,923,459 | B2 | * | 8/2005 | Yeo et al. | 280/87.041 |
| 6,976,687 | B2 | * | 12/2005 | Beleski, Jr. | 280/87.041 |
| 6,991,242 | B2 | * | 1/2006 | Teng et al. | 280/87.041 |
| 7,134,677 | B2 | * | 11/2006 | Opsvik | 280/87.041 |
| 7,192,038 | B2 | * | 3/2007 | Tsai | 280/87.041 |
| 7,377,528 | B1 | * | 5/2008 | Xie | 280/87.041 |
| 7,438,297 | B2 | * | 10/2008 | Fernandez et al. | 280/14.27 |
| 7,549,655 | B2 | * | 6/2009 | Fan | 280/87.041 |
| 7,597,334 | B2 | * | 10/2009 | Chen | 280/87.041 |
| 7,681,895 | B2 | * | 3/2010 | Chen | 280/87.041 |
| 7,837,209 | B2 | * | 11/2010 | Spencer et al. | 280/87.042 |
| 7,926,825 | B2 | * | 4/2011 | Chen | 280/87.043 |
| D658,724 | S | * | 5/2012 | Epstein | D21/423 |
| 8,205,895 | B2 | * | 6/2012 | Chen et al. | 280/87.041 |

(Continued)

*Primary Examiner* — Jeffrey J Restifo
*Assistant Examiner* — Erez Gurari

(57) ABSTRACT

A wiggling freewheeled vehicle comprises a folding assembly disposed between a main frame and two carrying frames. The folding assembly includes a pivot movably disposed on the main frame, clasp members integrally formed on the carrying frames, and a fastener able to fix the clasp members. Wherein, the clasp members are pivotally engaged with each other at a place where the pivot could fitly penetrate. By wrapping the main frame in the clasp members that are fixed by the fastener, the vehicle is available for a smooth operation. Oppositely, by releasing the main frame from the clasp members, the vehicle could be folded or collapsed while bending the main frame. Moreover, the collapsed vehicle allows the main frame to be arranged tightly abreast the carrying frames for achieving a compact structure. Thus, the collapsed freewheeled vehicle contributes to a reduced dimension and is beneficial for transportation and storage.

6 Claims, 7 Drawing Sheets

U.S. PATENT DOCUMENTS

| | | | |
|---|---|---|---|
| 2002/0050695 A1* | 5/2002 | Feng | 280/87.041 |
| 2002/0053775 A1* | 5/2002 | Feng | 280/87.041 |
| 2002/0063406 A1* | 5/2002 | Feng | 280/87.041 |
| 2002/0070519 A1* | 6/2002 | Rappaport | 280/87.041 |
| 2003/0090076 A1* | 5/2003 | Beleski, Jr. | 280/87.041 |
| 2004/0094925 A1* | 5/2004 | Chuang | 280/87.041 |
| 2004/0178597 A1* | 9/2004 | Tang | 280/87.041 |
| 2004/0256821 A1* | 12/2004 | Chuang | 280/87.041 |
| 2004/0256822 A1* | 12/2004 | Chuang | 280/87.041 |
| 2004/0256823 A1* | 12/2004 | Chuang | 280/87.041 |
| 2004/0256824 A1* | 12/2004 | Chuang | 280/87.041 |
| 2005/0001399 A1* | 1/2005 | Yeo et al. | 280/87.041 |
| 2005/0082778 A1* | 4/2005 | Chuang | 280/87.041 |
| 2005/0093261 A1* | 5/2005 | Liao et al. | 280/87.041 |
| 2005/0156396 A1* | 7/2005 | Teng et al. | 280/87.041 |
| 2005/0212245 A1* | 9/2005 | Fernandez et al. | 280/87.041 |
| 2008/0179849 A1* | 7/2008 | Fan | 280/87.041 |
| 2010/0234186 A1* | 9/2010 | Fan | 482/51 |
| 2011/0089656 A1* | 4/2011 | Chiu et al. | 280/87.041 |
| 2012/0043733 A1* | 2/2012 | Tsai | 280/87.05 |

* cited by examiner

WIGGLING FREEWHEELED VEHICLE

BACKGROUND OF THE INVENTION

1. Field of the Invention

The present invention relates to a freewheeled vehicle, in particular to a wiggling freewheeled vehicle that promotes convenience like utilization, transportation, and storage.

2. Description of the Related Art

Referring to FIGS. 1 and 2, a Taiwan patent No. M322912 discloses a scooter 1 that includes a main frame 11, a supporting frame 12 rotatably disposed on the main frame 11, a brake set 13 mounted on the supporting frame 12, a front wheel 14 pivoted to the supporting frame 12, a left carrying frame 15 and a right carrying frame 16 respectively extended from the main frame 11, and rear wheel sets 17 installed on the left carrying frame 15 and the right carrying frame 16. Wherein, a fixture 18 is disposed on the main frame 11, and a pivot 181 is rotatably disposed on front ends of the left carrying frame 15 and the right carrying frame 16, respectively. Further, at least one fastener 182 is provided for fixing the fixture 18. By means of the fixture 18, the carrying frames 15, 16, and the rear wheel sets 17, exerciser is able to propel the scooter 1 via imparting a force on the carrying frames 15, 16 by his feet. Thereby, the alternate body weights on the carrying frames 15, 16 with the feet cause the scooter to move forward along an S-route. Moreover, steering the handlebars that are disposed relative to the front wheel 14 and accordingly disposed on the supporting frame 12 allows the riding operation of the scooter 1 to be facile. Preferably, a fun and entertained exercise is achieved.

However, there are shortcomings existing in the practical operation as follows.

1. The fixture 18 between the carrying frames 15, 16 is actually a fixed structure, so the carrying frames 15, 16 are unable to be closely arranged in view of the obstruction brought about by the fixture 18 when the scooter 1 is to be collapsed. Even worse, the main frame 11 is incapable of compactly staying aside the carrying frames 15, 16 in time of collapsing the scooter 1 (as shown in FIG. 2), so an extra bonding strip B would be needed for further securing the incompact collapsed scooter 1. Obviously, such practical operation of the scooter 1 is troublesome, especially for transportation and storage.

2. The fixture 18 is fixed to the main frame 11 via the fasteners 182. When the scooter 1 is to be collapsed and when the main frame 11 is to be folded toward the carrying frames 15, 16, the fixture 18 adversely obstructs the folding route of the main frame 11. For eliminating the obstruction, the disclosure reserves an adequate room at a joint A of the fixture 18 and the main frame 11 (as shown in FIG. 1). However, the room at the joint A unbeneficially results in a loose engagement between the fixture 18 and the main frame 11. Accordingly, propelling the scooter 1 via the carrying frames 15, 16 unavoidably causes some twisting force and some shearing force on the joint A of the fixture 18 and the main frame 11. As a result, such twisting force and shearing force exerted on the joint A that is especially reserved for the adequate room may easily incur a broken pivot 181 after a long period of using time. Therefore, the using safety of the scooter 1 is concerned.

3. Further, the carrying frames 15, 16 are pivotally engaged with the fixture 18. That is to say, the main frame 11 and the carrying frames 15, 16 are indirectly connected. Whereby, the propelling force generated from the exerciser would be firstly transmitted to the fixture 18 and then conveyed to the main frame 11. Afore indirect transmission of the propelling force in fact largely influences the moving speed and the freewheeling fluency of the scooter 1. Therefore, such inferior influence should be removed.

SUMMARY OF THE INVENTION

The object of the present invention is to provide a wiggling freewheeled vehicle that contributes to the convenience in utilization, transportation, and storage.

The wiggling freewheeled vehicle in accordance with the present invention comprises a main frame, a subordinate frame disposed on the main frame, two carrying frames indirectly extended from the main frame, a front wheel rotatably installed on one end of the main frame, and rear wheel sets rotatably installed on free ends of the carrying frames.

Characterized in that, a folding assembly is disposed between the carrying frames and the main frame. The folding assembly includes a pivot rotatably disposed on the main frame, clasp members integrally formed on ends of the carrying frames for clasping the main frame, and a fastener able to fix the clasp members. Wherein, the clasp members on the carrying frames are movably engaged with each other via the pivot penetrating therethrough.

Accordingly, by means of the folding assembly, the freewheeled vehicle could be operated while the main frame is firmly wrapped in the clasp members and fixed via the fastener. In the contrast, the freewheeled vehicle is collapsible while the clasp members do not engage with the fastener and do not wrap the main frame. Thereby, the collapsed freewheeled vehicle allows the main frame to tightly stay aside the carrying frames. Obviously, such compacted freewheeled vehicle is convenient for transportation and storage.

Preferably, the fastener adopts a screw for being screwed into threaded holes defined on the clasp members so as to fix the main frame.

Preferably, an engaging hole is further correspondingly defined on each of the clasp members for the fastener to penetrate therethrough so as to fix the main frame of the collapsed vehicle.

Preferably, a hole is defined on said main frame, correspondingly to the engaging holes while the main frame slants toward the carrying frames.

Preferably, an indentation is formed on a convergence of the clasp members and the main frame for adaptively receiving the front wheel while the vehicle is collapsed and while the main frame slants toward the carrying frames.

Preferably, an excurved oblique surface is formed on each clasp member, near the front wheel.

The advantages of the present invention over the known prior art will become more apparent to those of ordinary skilled in the art upon reading the following descriptions in junction with the accompanying drawings.

DETAILED DESCRIPTION OF THE PREFERRED EMBODIMENTS

Figure 1:
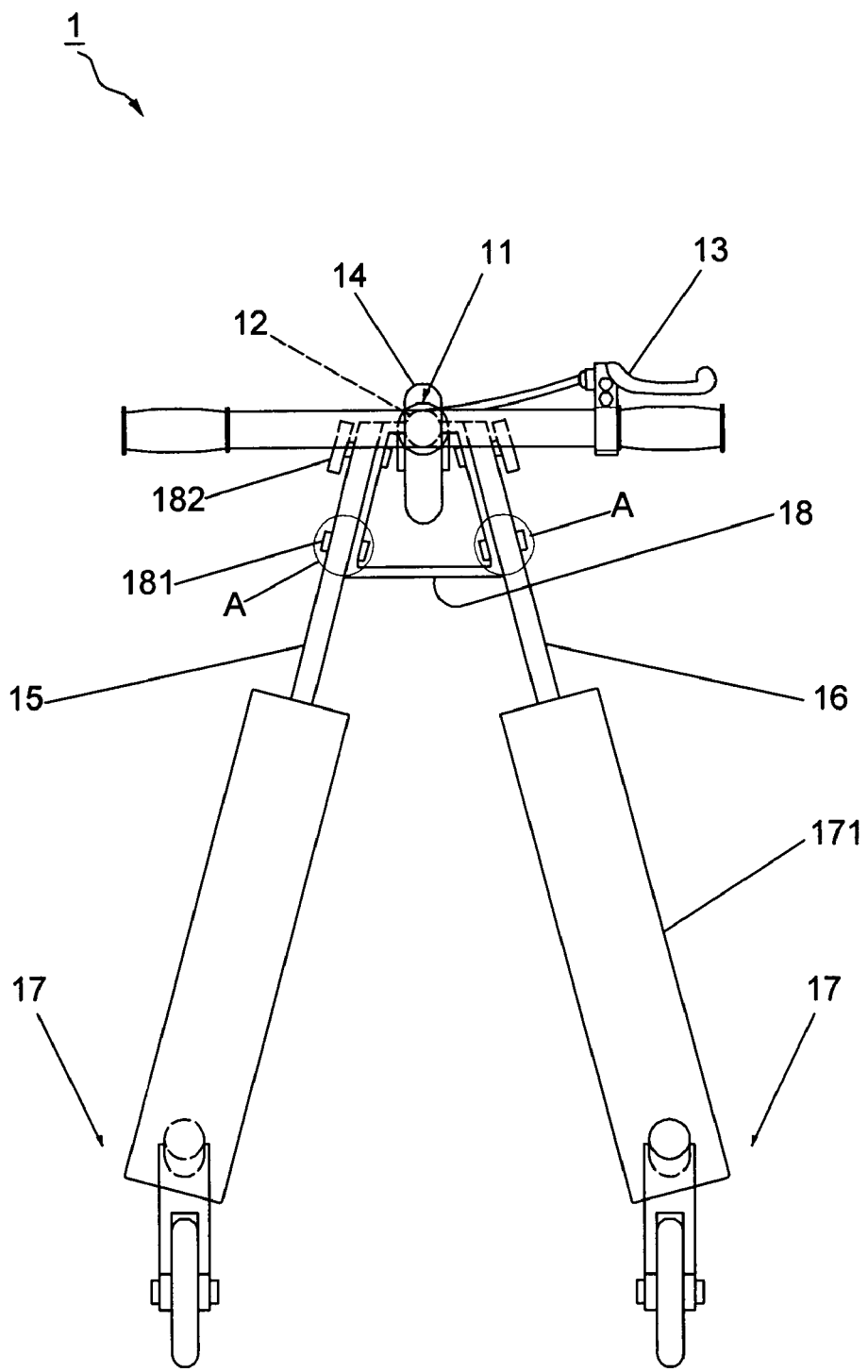
FIG. 1 is a top view showing a conventional freewheeled vehicle.
Figure 2:
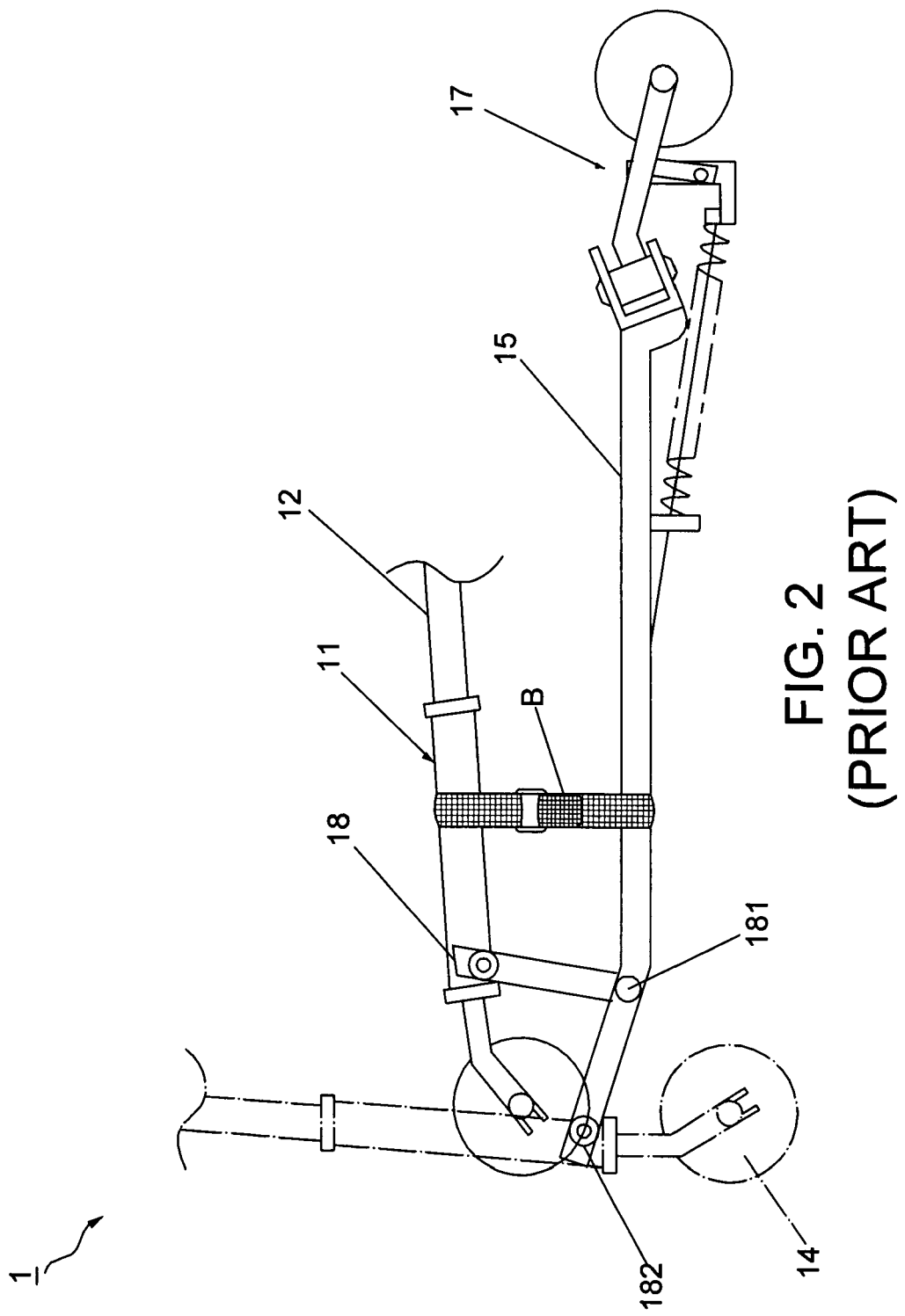
FIG. 2 is a schematic view showing the conventional scooter in folding.

Before the present invention is described in greater detail, it should be noted that the like elements are denoted by the same reference numerals throughout the disclosure.

Figure 3:
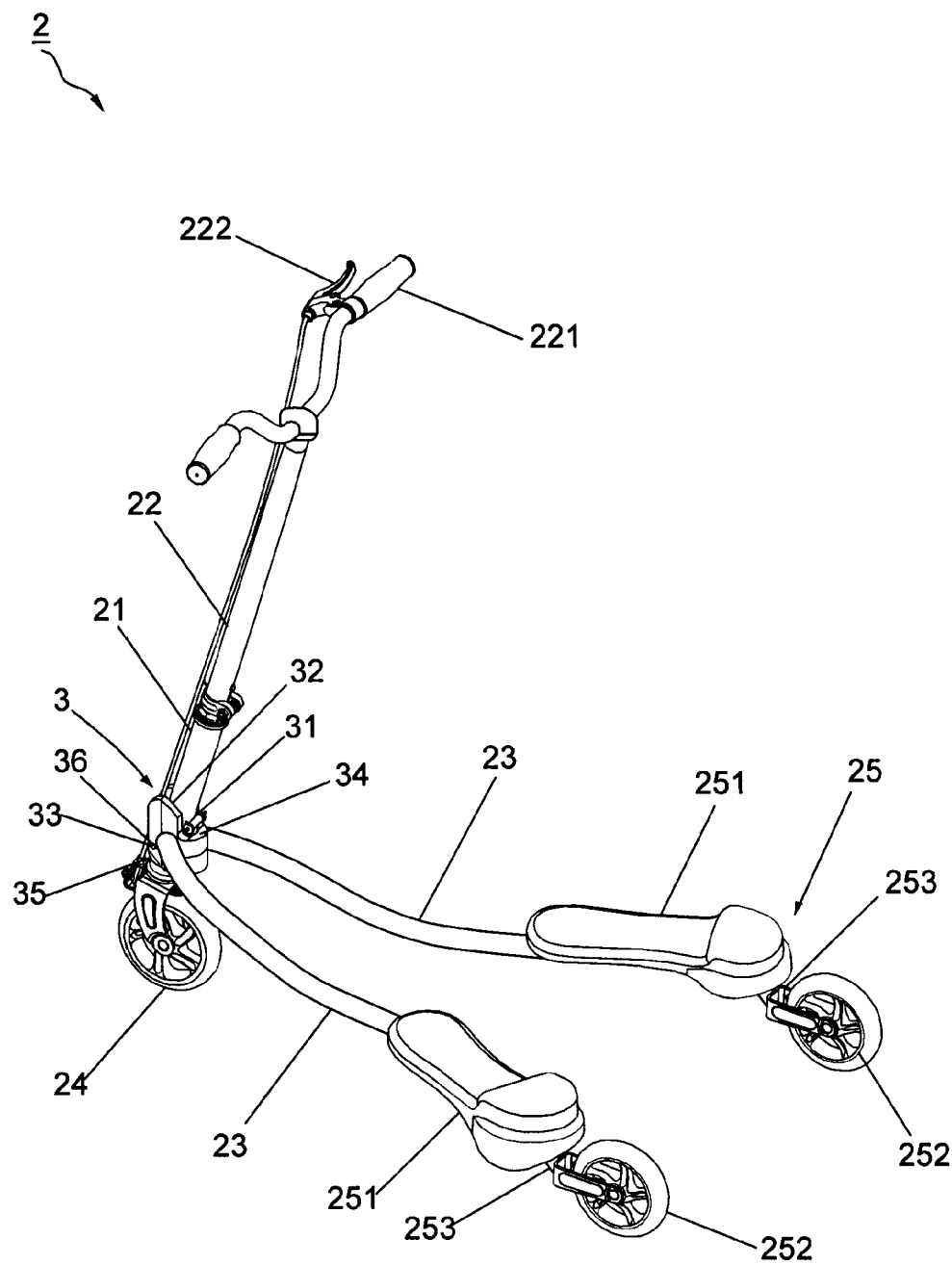
FIG. 3 is a perspective view showing a first preferred embodiment of the present invention.

Referring to FIG. 3, a first preferred embodiment of the present invention shows a wiggling freewheeled vehicle 2 comprising a main frame 21, a subordinate frame 22 disposed on the main frame 21, two carrying frames 23 indirectly extended from the main frame 21, a front wheel 24 rotatably installed on one end of the main frame 21, and rear wheel sets 25 rotatably installed on free ends of the carrying frames 23. Two handlebars 221 are disposed on the subordinate frame 22 for exerciser to steer the vehicle. A brake set 222 is disposed on the handlebar 221 and connected to the front wheel 24 for decreasing the advancing speed of the vehicle. Each rear wheel set 25 includes a pedal 251 and a rear wheel 252 disposed on the free end of the carrying frame 23, and a transmitting member 253 triggered by the pedal 251 for rotating the rear wheel 252.

Figure 4:
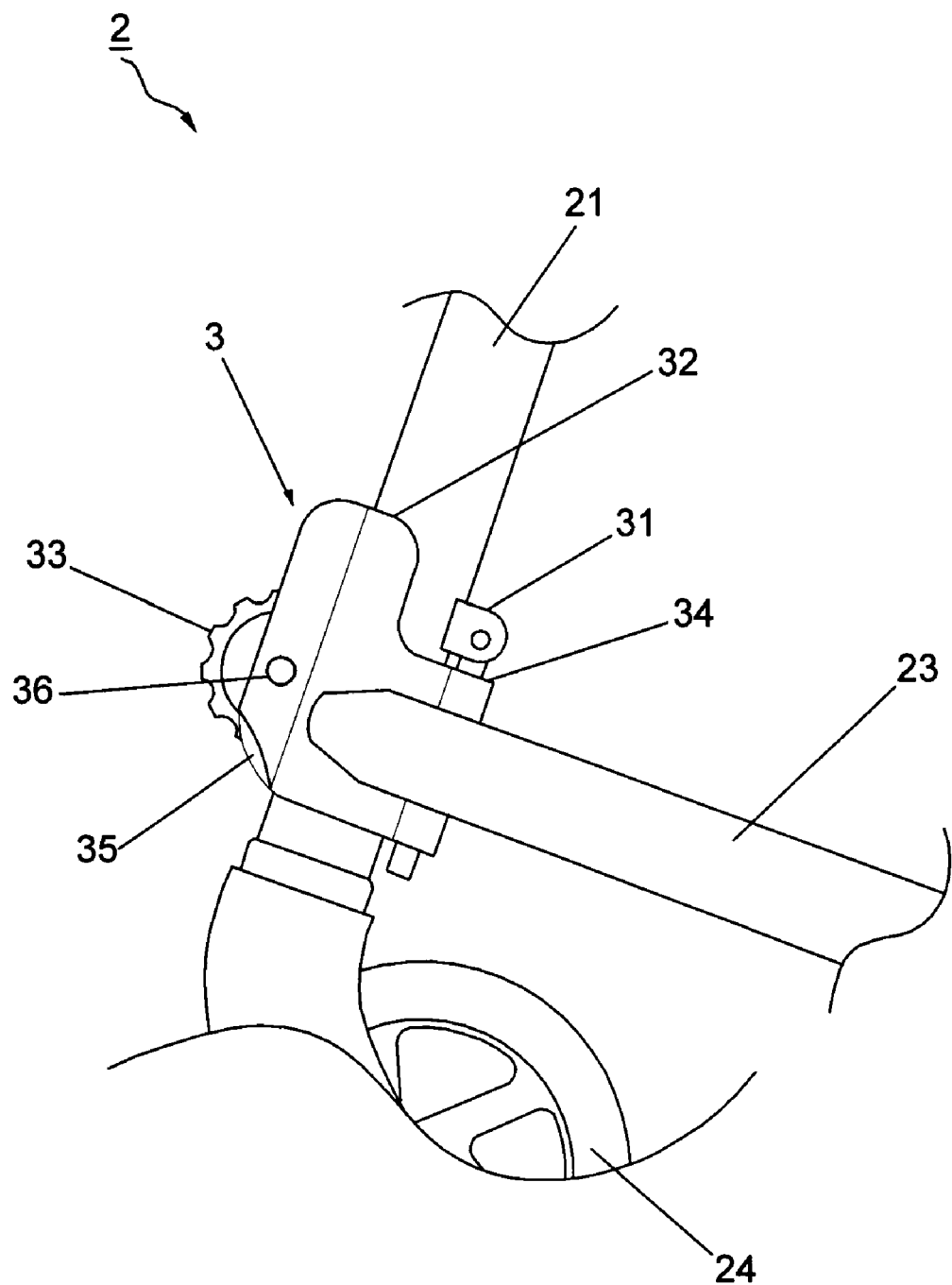
FIG. 4 is a schematic view showing the partial first preferred embodiment of the present invention.

Continuingly, accompanying with FIG. 4, a folding assembly 3 is disposed between the carrying frames 23 and the main frame 21. The folding assembly 3 includes a pivot 31 rotatably disposed on the main frame 21, clasp members 32 integrally formed on ends of the carrying frames 23 for clasping the main frame 21, and a fastener 33 able to fix the clasp members 32. Wherein, the clasp members 32 on the carrying frames 23 are movably engaged with each other via the pivot 31 penetrating therethrough. Moreover, an indentation 34 is formed on a convergence of the clasp members 32 and the main frame 21, and an excurved oblique surface 35 is formed on each clasp member 32, near the front wheel 24. Herein, the excurved oblique surfaces 35 are formed curved outward, opposite to each other for adaptively receiving the front wheel 24 while the vehicle is collapsed. Favorably, the fastener 33 could alternatively adopt a buckling member that grips (not shown), so that the fastener 33 could embrace the clasp members 32. Herein, in this embodiment, the fastener 33 adopts a screw that cooperates with threaded holes 36 defined on the clasp members 32 for fixing the main frame 21.

Figure 5:
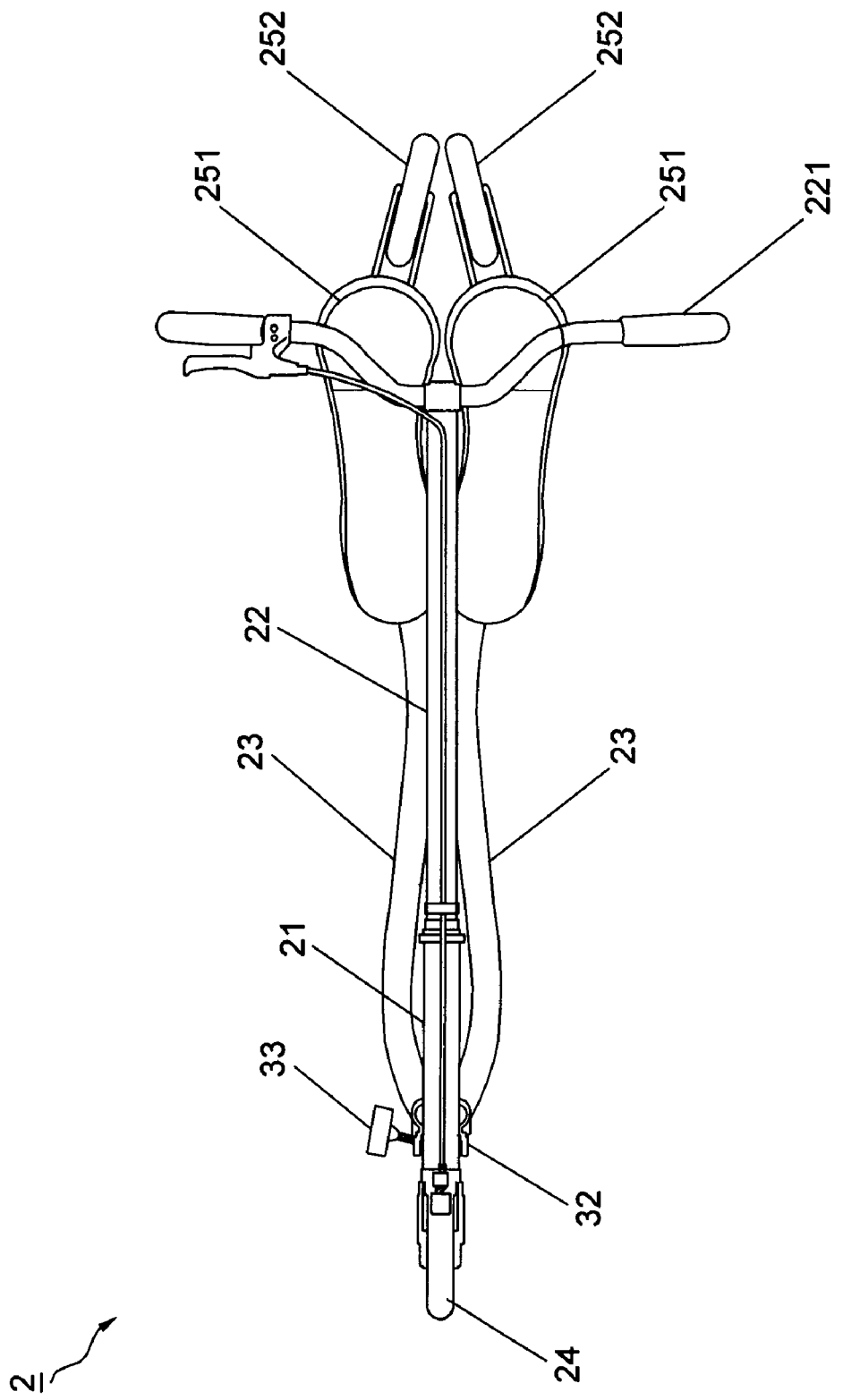
FIG. 5 is a schematic view showing the first preferred embodiment in operation.
Figure 6:
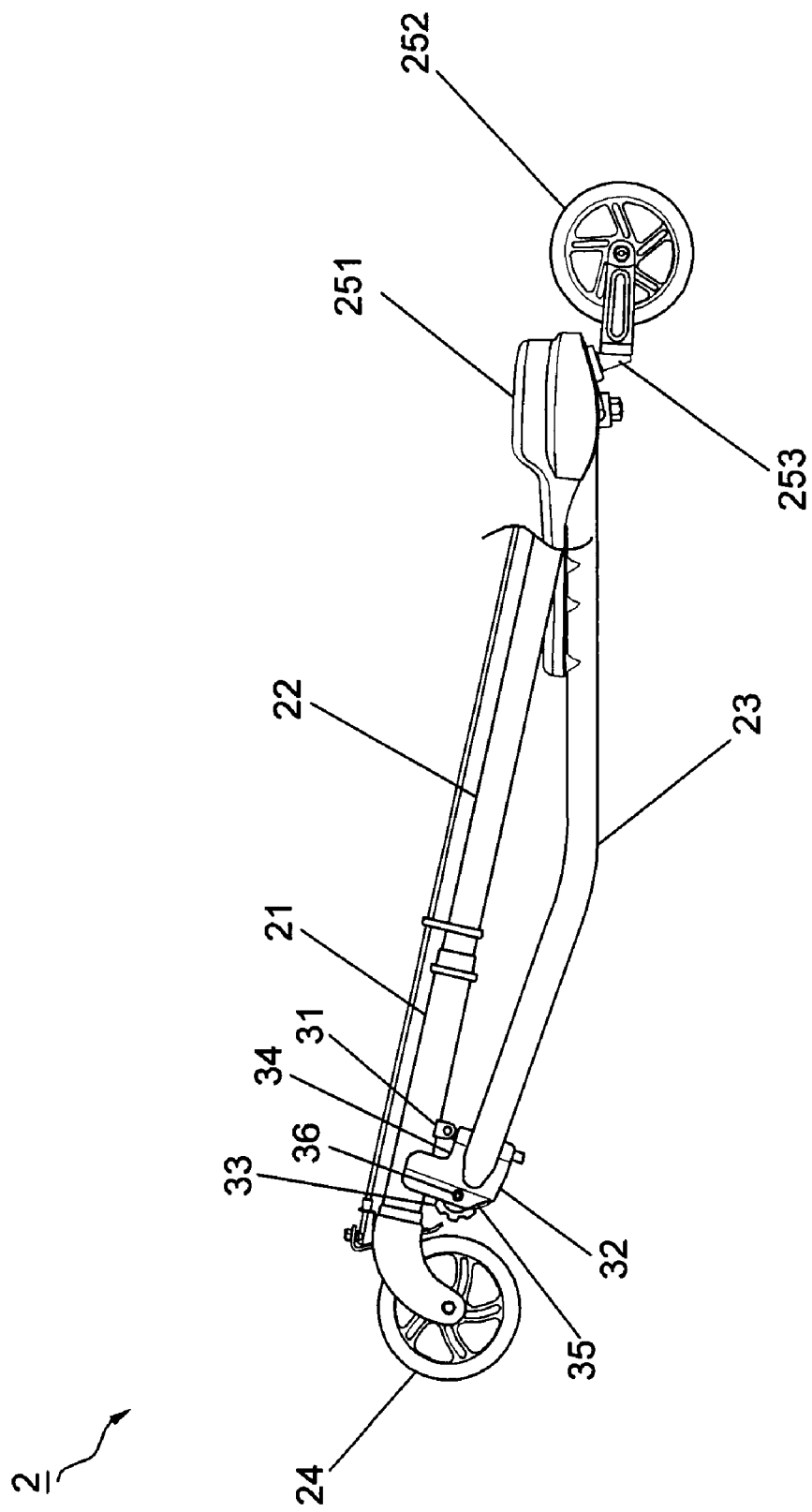
FIG. 6 is a schematic view showing a second preferred embodiment of the present invention.

Referring to FIGS. 3, 4, and 5, when the freewheeled vehicle 2 is not used, it could be collapsed with the following means: The fastener 33 that is originally engaged with the threaded holes 36 is unscrewed. Thereby, the unscrewed fastener 33 causes the clasp members 32 to be released, which allows the integral-connected carrying frames 23 to be arranged tightly abreast with each other. Accordingly, unwrapped in view of the released clasp members 32, the main frame 21 thence slants toward the indentations 34 via the pivot 31 that serves as a rotation axis. Further, by means of the excurved oblique surface 35, the slanted main frame 21 and the front wheel 24 disposed at the end of the main frame 21 are prevented from obstruction incurred by the folding assembly 3 because the excurved oblique surface 35 offers an adaptive room for the front wheel 24. Thus, the front wheel 24 is not easily damaged by the obstruction. Whereby, the slanted main frame 21 is arranged tightly aside the carrying frames 23 (as shown in FIG. 6). Afterwards, by penetrating the fastener 33 through the correspondent threaded holes 36 preferably renders a compact and immovable collapsed freewheeled vehicle 2. Advantageously, the collapsed freewheeled vehicle 2 does not need any extra bonding means for achieving the compact structure but still favorably offers a more reduced dimension than that of the conventional one. Thus, the freewheeled vehicle in accordance of the present invention is advantageous for being transported and stored with convenience.

While riding the freewheeled vehicle of the present invention, just simply unscrew the fastener 33 engaged with the threaded holes 36. Succeedingly, upright the main frame 21 from the carrying frames 23 and push the main frame 21 into the clasp members 32. Thence, separate the carrying frames 23 so as to wrap the main frame 21 in the clasp members 32. Finally, attach the fastener 33 into the threaded holes 36 so as to fix the main frame 21. Evidently, the assembling of the freewheeled vehicle is effortless, and as a result, the freewheeled vehicle is able to be operated. Wherein, the riding operation of the present invention is obtained by the exerciser steering the handlebars 221 to control the advancing route of the vehicle. When the exerciser propels the vehicle by his feet stepping on the pedals 251, an alternate body weight exchange will allow the vehicle to go forward. In the mean time, exerciser's bottom and waist wiggle for moving the vehicle. During the wiggling, the transmitting members 253 trigger the rotation of the rear wheels 252. Herein, the propelling force on the present invention resulted from exerciser's wiggling is directly transmitted to the main frame 21 through the carrying frames 23. By cooperating with the exerciser steering the handlebars 221 to control the subordinate frame 22 and the front wheel 24, the freewheeled vehicle thence swings and slides forward.

Herein, since the carrying frames 23 are integrally formed on the clasp members 32, the twisting force and the shearing force generated in time of the body weight exchange are not enforced upon the convergence of the clasp member 32 and the carrying frame 23. Thus, the wheeling of the freewheeled vehicle 2 is ensured to be safe and more stable.

Figure 7:
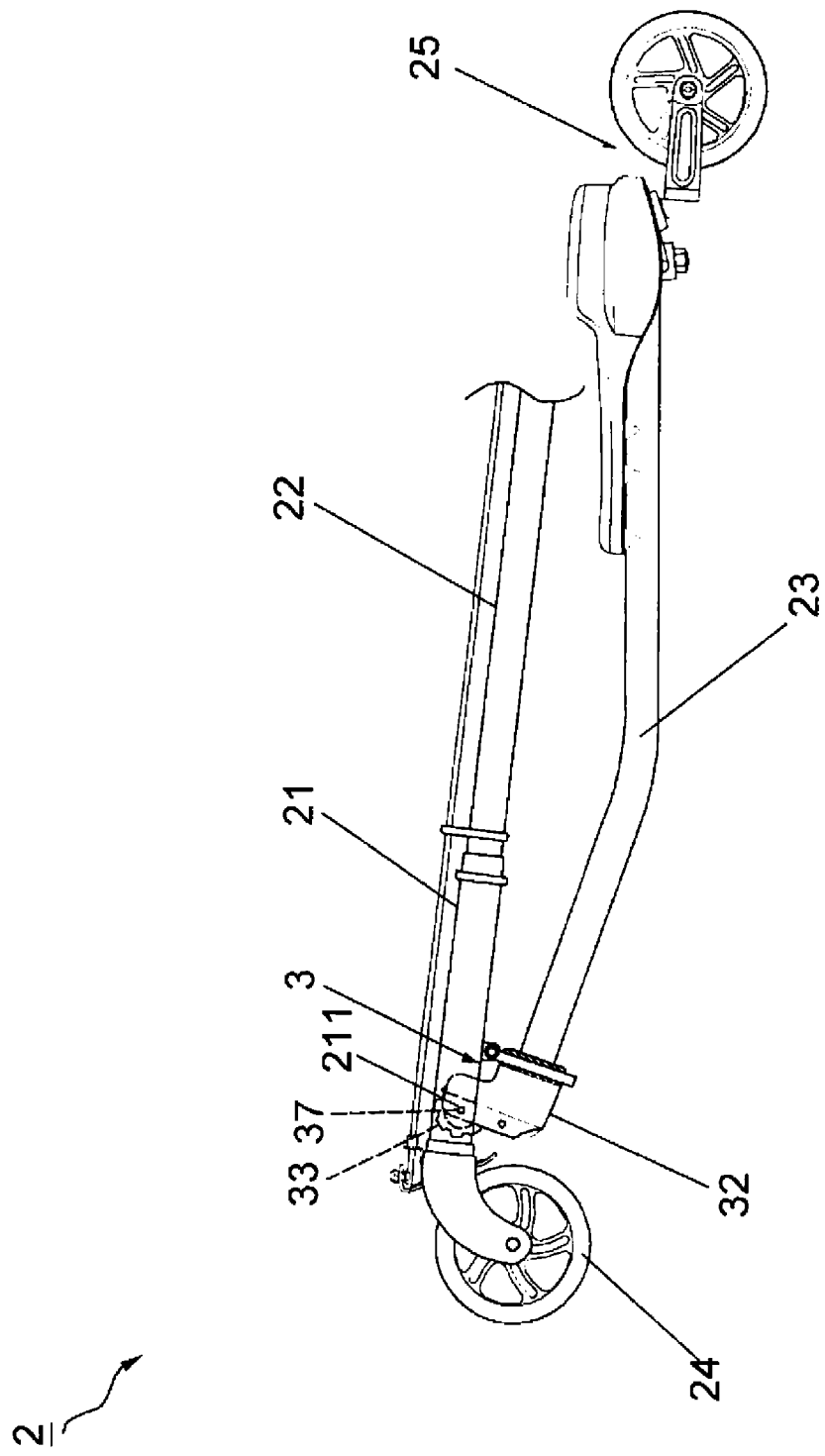
FIG. 7 is a schematic view showing the second preferred embodiment in operation.

Referring to FIG. 7, a second preferred embodiment of the present invention is shown. The freewheeled vehicle 2 includes the elements and the correlations similar to those of the first preferred embodiment, such as the main frame 21, the subordinate frame 22, two carrying frames 23, the front wheel 24, the rear wheel sets 25, and the folding assembly 3. Differently in this embodiment, an engaging hole 37 is defined on each of the clasp member 32. The engaging hole 37 is further arranged in accordance with a hole 211 defined on the main frame 21 while the vehicle is collapsed. Whereby, inserting the fastener 33 through the engaging hole 37 and the hole 211 is able to firmly fix the collapsed vehicle, which further ensures the compact structure of the collapsed vehicle.

To sum up, the present invention takes advantage of the folding assembly disposed between the carrying frames and the main frame to promote the using convenience. Namely, when the main frame is wrapped and fixed by the folding assembly, the freewheeled vehicle could be propelled; when the main frame is released by the folding assembly, the freewheeled vehicle could be collapsed. In addition, the collapsed vehicle allows the main frame and the carrying frames to be arranged tightly aside with each other, so the collapsed vehicle is compact and the dimension thereof is reduced, which is beneficial for transportation and storage.

While we have shown and described the embodiment in accordance with the present invention, it should be clear to those skilled in the art that further embodiments may be made without departing from the scope of the present invention.

I claim:

1. A wiggling freewheeled vehicle comprising a main frame, a subordinate frame disposed on said main frame, two carrying frames indirectly extended from said main frame, a front wheel rotatably installed on one end of said main frame, and rear wheel sets rotatably installed on free ends of said carrying frames; two handlebars being disposed on said subordinate frame for steering said vehicle; a brake set being disposed on said handlebars and connected to said front wheel for decreasing the advancing speed of said vehicle; each rear wheel set including a pedal and a rear wheel disposed on said free end of said carrying frame, and a transmitting member pivoted to said carrying frame and said front wheel;

wherein, a folding assembly is disposed between said carrying frames and said main frame; said folding assembly including a pivot rotatably disposed on said main frame, clasp members integrally formed on ends of said carrying frames for clasping said main frame, and a fastener able to fix said clasp members; said clasp members on said carrying frames being movably engaged with each other at a place where said pivot could fitly penetrate.

2. The vehicle as claimed in claim 1, wherein, said fastener adopts a screw for being screwed into threaded holes defined on said clasp members so as to fix said main frame.

3. The vehicle as claimed in claim 2, wherein, an engaging hole is further correspondingly defined on each of said clasp members for said fastener to penetrate therethrough so as to fix said main frame of said collapsed vehicle.

4. The vehicle as claimed in claim 3, wherein, a hole is defined on said main frame, correspondingly to said engaging holes while said main frame slants toward said carrying frames.

5. The vehicle as claimed in claim 1, wherein, an indentation is formed on a convergence of said clasp members and said main frame for adaptively receiving said front wheel while said vehicle is collapsed and while said main frame slants toward said carrying frames.

6. The vehicle as claimed in claim 1, wherein, an excurved oblique surface is formed on each clasp member, near said front wheel.

* * * * *